United States Patent
Lovranich et al.

(10) Patent No.: US 8,672,662 B2
(45) Date of Patent: Mar. 18, 2014

(54) PLASTIC EXTRUDER

(75) Inventors: Christian Lovranich, Weissenbach/Triesting (AT); Johann Brandstaetter, Furth/Triesting (AT); Andreas Pechhacker, Altenmarkt (AT)

(73) Assignee: Starlinger & Co Gesellschaft m.b.H., Vienna (AT)

( * ) Notice: Subject to any disclaimer, the term of this patent is extended or adjusted under 35 U.S.C. 154(b) by 96 days.

(21) Appl. No.: 13/146,915

(22) PCT Filed: Jan. 15, 2010

(86) PCT No.: PCT/EP2010/050438
§ 371 (c)(1),
(2), (4) Date: Oct. 17, 2011

(87) PCT Pub. No.: WO2010/089173
PCT Pub. Date: Aug. 12, 2010

(65) Prior Publication Data
US 2012/0021085 A1 Jan. 26, 2012

(30) Foreign Application Priority Data
Feb. 3, 2009 (AT) .................................. A 184/2009

(51) Int. Cl.
*B29C 47/76* (2006.01)
(52) U.S. Cl.
USPC .............................. 425/203; 366/75; 425/205
(58) Field of Classification Search
USPC ............. 425/202, 203, 206, 209, 205; 366/75
See application file for complete search history.

(56) References Cited

U.S. PATENT DOCUMENTS

| | | | | |
|---|---|---|---|---|
| 3,963,558 A * | 6/1976 | Skidmore | ...................... | 159/2.2 |
| 4,063,718 A * | 12/1977 | Koch | ................................ | 366/75 |
| 4,130,901 A | 12/1978 | Borovikova | | |
| 4,900,494 A * | 2/1990 | Wobbe | .......................... | 264/102 |
| 5,661,872 A * | 9/1997 | Meyer et al. | .................. | 15/309.2 |
| 5,935,297 A * | 8/1999 | Amlinger | .......................... | 95/21 |
| 6,129,873 A * | 10/2000 | Shelby et al. | ................. | 264/102 |
| 2003/0015612 A1 * | 1/2003 | Barth et al. | ................. | 241/260.1 |

FOREIGN PATENT DOCUMENTS

| | | |
|---|---|---|
| EP | 0698462 | 2/1996 |
| EP | 0938960 | 9/1999 |
| GB | 2270029 | 3/1994 |
| JP | S49-42910 | 11/1974 |
| JP | 08-169524 | 7/1996 |
| JP | 08-224736 | 9/1996 |
| JP | 2002-086542 | 3/2002 |
| WO | WO 2005/123817 | 12/2005 |

OTHER PUBLICATIONS

PCT/EP2010/050438, Mar. 1, 2011, International Search Report.
2011-548629, Apr. 2, 2013, Japanese Office Action.

* cited by examiner

*Primary Examiner* — Yogendra Gupta
*Assistant Examiner* — Joseph Leyson
(74) *Attorney, Agent, or Firm* — Workman Nydegger

(57) ABSTRACT

The invention relates to a device (1) for extruding thermoplastic material, having an extruder housing (22) in which an extruder screw (22) driven by a drive device (23) is supported rotatably about the axis thereof, said housing comprising an intake opening (24) to which a plastic material feeder (3) is connected, said feeder comprising at least one air inlet opening (36), wherein the extruder housing (22) comprises at least one vapor outlet opening (41) upstream of the intake opening (24) and an air/vapor path (28) is defined from the intake opening (24) to the vapor outlet opening (41).

7 Claims, 1 Drawing Sheet

PLASTIC EXTRUDER

CROSS-REFERENCE TO RELATED APPLICATIONS

Figure 1:
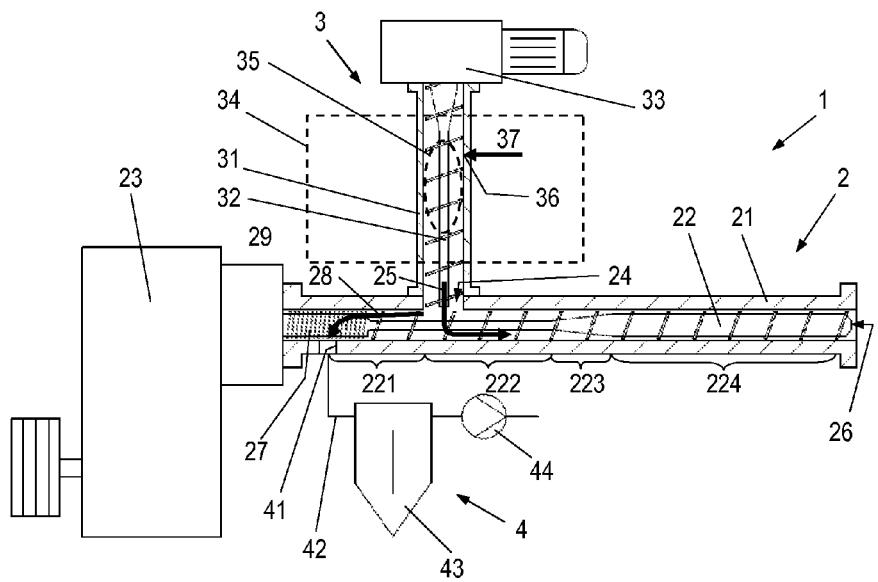

This Patent Application is a U.S. National Stage of International Application No. PCT/EP2010/050438, filed on Jan. 15, 2010, which claims priority to Austrian Application No. A 0184/2009, filed on Feb. 3, 2009, the disclosures of which are incorporated herein by reference in their entireties.

The invention relates to a device for extruding thermoplastic material, having an extruder housing in which an extruder screw driven by a drive device is supported rotatably about the axis thereof, said housing comprising an intake opening to which a plastic material feeder is connected, said feeder comprising at least one air inlet opening.

Before thermoplastic waste can be fed to the recycling process proper, these materials have to be available in pure form. Therefore, these are separated, for example, into the individual fractions polyolefins—as representatives thereof there are to be mentioned polyethylene (PE) as well as polypropylene (PP)—, polyvinylchloride (PVC) and polystyrene (PS), and adhering foreign matter such as metals or colors are usually removed using physical procedures. The single-variety plastic waste is then usually purified using water and subsequently processed by means of conventional methods of plastics processing. These methods include, for example, extrusion.

Problems in the processing of the collected plastic waste are the greatly varying operational conditions in connection with the charging of such recycling plants. Hence, there have to be controlled various levels of residual moisture, contamination, density differences and feed portions in order to obtain a homogenous product of constant product quality from a heterogeneous waste.

Varying operational conditions, in particular in connection with the processing of moist plastic goods, negatively affect the performance of an extruder. The moisture has a negative effect insofar as it results in a reduced and varying output performance of the extruder, in an unsteady melting performance and, hence, in reduced product quality as well as in greater wear and, in total, in a reduced productivity of the entire device.

From the state of the art, there is, for example, known the patent publication U.S. Pat. No. 6,126,100 proposing a device for the combined reduction and extrusion of thermoplastic material, which provides, in the region of a filling container for the moist material to be processed further a section for the drying thereof. In this section there is provided, above the reducing device, a nozzle for injecting dry, pre-heated air. At the upper end of the drying section, there is situated an outlet for discharging moist exhaust air, which is moved into a drying unit outside of the device, where it is dried and is then available as dry supply air.

This configuration is disadvantageous insofar as the extruder screw, downstream of the reducing device and situated beyond thereof, will not be perfused by the dry air leaving the injection nozzle. In this configuration, the level of residual moisture in the reduced plastic goods then cannot be discharged from the extruder screw anymore and therefore impedes the productivity of the device. Furthermore, due to the formation of condensate in the region of the reducing device and of the extruder, the formation of corrosion is increased.

EP 638 017 B1 illustrates a method and a device for recycling fumigated plastic material such as, e.g. foamed polystyrene. In this device the plastic is melted, filtered, degassed, granulated and again fumigated by supplying or admixing, respectively, propellant gas. In this way, the plastic material supplied from the recycling process is initially moved into a reducing device formed as a ripping compressor and subsequently fed via a discharge opening directly into a screw-like extruder, in which the plastic material is plasticized and simultaneously degassed. A supply of air for drying the plastic material is provided neither in the region of the reducing device nor in the extruder. Afterwards the plasticized or molten-like, respectively, plastic that is available in the form of an intermediate product is removed from contamination in a filter and then pumped into a mixer for re-fumigation. This mixer may—comparable with an extruder—comprise a mixer screw with an externally situated drive motor, or it may alternatively include instead of the rotating mixer screw a static mixer without driven parts, in this way guaranteeing that the propellant gas is mixed with the supplied molten-like plastic intermediate product and that there is again generated a foamed plastic material. The extruder screw as well as the mixer screw have at their ends facing the driving elements each a section with screw worms feeding in the opposite direction. Thus this section forms an insulation of the driving shafts in regard to the housing passages towards the outside, perfusion with air or propellant gas, however, is not realized. Also in this configuration, the productivity of the extruder will be impeded by the residual moisture of the collected plastic material.

In AT 413 354 B there is introduced a processing unit for preferably thermoplastic material, comprising a reducing device with an extrusion device immediately downstream. The plastic goods to be processed are filled into a feeder device and are moved from there to a rotating processing drum, at the circumference of which there are attached several rows of simultaneously rotating knives arranged offset. By means of counter knives, stationarily provided opposite of the rotating processing drum on the frame of the reducing device, the plastic is reduced and subsequently moved into a feeder pipe situated underneath the processing drum. At the internal wall of said feeder pipe, there are attached at the lowest position, spaced apart, two injection nozzles for compressed air, which are directed in the direction of the discharge opening of the feeder pipe to the downstream extruder screw. By injecting compressed air, the movement of the plastic material in the direction of the discharge opening of the feeder pipe is enhanced. In this way, there is obtained a pneumatic feed of the plastic material through the feeder pipe into the extruder.

This configuration has the disadvantage that there is not achieved any drying effect by the compressed air injected. Outlet openings for discharging the moist air are not provided. By pneumatic feed of the reduced plastic material, there is also moved the residual moisture directly into the extruder, this leading to the problems in the operation initially mentioned.

There is thus a demand for reducing the disadvantages of the state of the art of such devices, which feed plastic waste of varying levels of residual moisture upon their reduction through an intake opening to the extruder. There is to be provided a device, which advantageously in a continuous operation guarantees efficient drying of the moist plastic waste also in the extruder and which thereby provides for a constant throughput performance of the extruder as well as a constant high product quality of the extruded material, independent, as far as possible, of any quality variances of the feeder material.

The present invention solves this aim by making provision of a device for extruding thermoplastic goods, wherein the extruder housing comprises at least one vapor outlet opening upstream of the intake opening and an air/vapor path is defined from the intake opening to the vapor outlet opening.

The term "upstream" refers to the material feeder device of the extruder screw rotating in the extruder housing.

Advantageous configurations of the invention are illustrated in the dependent claims and the specification.

The present invention has the following advantages over the known state of the art:

The device may be operated completely continuously and low-maintenance, and thermoplastic goods, which have preferably already been reduced before, may also be used with a level of residual moisture directly in the continuously operating plastic extruder.

The still present residual moisture in the supplied plastic goods will not impede the productivity of the extruder at all. Neither the output performance nor the melting performance of the extruder will thereby be reduced.

In such devices known from the state of the art the moisture will lead in the region of the dosing screw provided for the feed of material or directly subsequently in the extruder, respectively, to increased material wear and increased proneness to corrosion. This material strain will be omitted in the operation of the device according to the invention.

Because of the uniform operation and hence the increased productivity, the device according to the invention is more economic in operation than extruders known so far, which are not designed at all or only insufficiently to meet permanently varying operational parameter in the processing of plastic waste and for which there have not been made any provisions for a reliable discharge of the residual moisture of the plastic material from the inside of the extruder.

Due to the configuration of the extruder housing with at least one vapor outlet opening, which is arranged in the opposite direction to the feed direction of the plastic material in the extruder upstream and which is in this way protected against obstruction, the plastic goods will be dried in the extruder. Thereby, the formation of condensate inside the entire device will be reliably prevented.

In an advantageous embodiment of the extrusion device, the air/vapor path extends in a gap between the internal surface of the extruder housing and the extruder screw. Through the gap-like cross-section there is guaranteed a reliable discharge of the moisture along the air/vapor path to the outlet opening, even in the case of individual plastic particles being present in this section of the extruder.

Advantageously, the extrusion device has such a configuration that there is arranged at the extruder screw in the region of the air/vapor path a counter-thread, the thread of which having the same path direction as the screw worm of the extruder screw. Thereby, there is obtained that upon rotation of the extruder screw the counter-thread, which is provided in a section of the extruder screw situated upstream of the intake opening, in this section will act in the opposite direction to the feed direction of the plastic material. In this way any plastic material present will be fed from the vapor outlet opening away in the extrusion direction, this advantageously preventing the discharge of plastic goods out of the vapor outlet opening and, hence, keeping clear the air/vapor path. The moist air will flow in this section along the air/vapor path in a counter-flow to the feed direction of the counter-thread towards the outlet opening.

It will be of advantage if the counter-thread at the extruder screw in the region of the air/vapor path is provided with a smaller incline and smaller flight depth compared with the incline of the screw worm of the extruder screw and if the gap width between the counter-thread and the extruder housing is less than 1 mm, preferably less than 0.5 mm. Due to the smaller incline of the counter-thread, extending in the section situated upstream of the intake opening directly into the screw worm of the extruder screw, the plastic material will be transported more slowly out of this section than in the intended feed direction towards extrusion. Smaller amounts of plastic goods, which enter this section in the opposite direction to the feed direction, will be safely transported away by the counter-thread, in this way preventing obstructions. The preferably smaller gap width between the counter-thread and the extruder housing also helps to prevent that larger plastic parts reach the region upstream of the intake opening and obstruct the air/vapor path in the region of the counter-thread.

In another advantageous embodiment for solving the aim according to the invention, the extrusion device is provided with a vapor suction device connected to the vapor outlet opening. By means of the vapor suction device, the discharge of moist air or vapor, respectively, from the extrusion device is further enhanced, and the drying rate of the moist plastic goods is advantageously increased.

Such a vapor suction device may preferably be formed as a lateral channel compressor. This type of compressor construction is especially compact and suitable for all purposes, in which there is required more pressure or negative pressure, respectively, than conventional fans are able to generate. Advantageously lubrication is not required in such compressors, and the process of compression is realized without any oil, the gas will not be polluted.

Another advantageous configuration of an extrusion device is such that there is connected a water separator between the vapor outlet opening and the vapor suction device. By means of a water separator, which is provided at the suction side upstream of the vapor suction device, for example a lateral channel compressor, the vapor suction device is protected against corrosion, and the moisture of the exhaust air is selectively collected and discharged.

In the two drawings there is schematically illustrated a possible configuration of the object of the invention in different views.

FIG. 1 illustrates the extrusion device 1 in a top view, wherein the extruder 2 as well as the plastic material feeder 3 are displayed partly cut-open.

Figure 2:
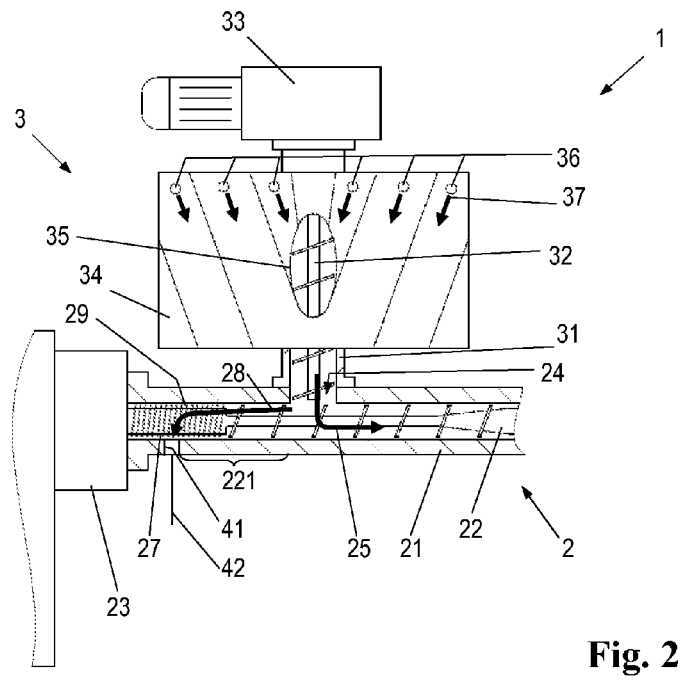

FIG. 2 illustrates a detail of a special configuration of the extrusion device 1 in the top view, wherein also parts of the extruder 2 as well as of the plastic material feeder 3 are displayed in a sectional view.

FIG. 1 illustrates a configuration of the extrusion device 1 according to the invention with the substantial units of extruder 2, plastic material feeder 3 as well as the device for vapor discharge 4.

The extruder 2 comprises a cylindrical extruder housing 21, with an extruder screw 22 arranged therein and supported rotatably about the axis thereof, which is connected to one end with a drive device 23 and is driven thereby. The extruder housing 21 has an intake opening 23, through which in the direction of arrow 25 the reduced plastic goods are moved from the plastic material feeder 3 into the extruder 2 or into the extruder screw 22, respectively, and fed on from there further to the discharge opening 26 of the extruder 2. At the opposite end of the extruder 2 there is situated a section with a counter-thread 27, directly adjoining the section with the screw thread on the extruder screw 22 and arranged thereat. The counter-thread 27 is situated directly adjoining to the drive device 23 at the extruder screw 22 upstream of the intake opening 24. Opposite to the stationary extruder housing 21, the counter-thread 27, which is simultaneously rotating with the extruder screw 22 in the same direction, has a smaller gap width 29. In FIG. 1 the extruder housing 21 is displayed cut-open in an axial view so that the extruder screw 22 situated therein including the section with the counter-thread 27 can be seen. The individual sections are indicated in a series. The section 221 on the extruder screw 22 is situated upstream of the intake opening 24 and extends to the vapor outlet opening 41. The section 222 on the extruder screw 22 is also referred to as intake zone and extends from the intake opening 24 to the compression zone 223. In the intake zone 222 the plastic material to be extruded is fed into the extruder 2, it is melted and compressed. The intake zone 222 is directly followed by the compression zone 223, in which the material is further compressed due to the reduced flight depth in the conical part of the extruder screw 22. In the following discharge zone 224, the pressure requisite for the discharge of the material is formed, thus guaranteeing the feed into a subsequent tool not displayed.

The plastic material feeder 3 comprises a cylindrical housing 31 having a dosing screw 32 situated in the inside thereof, which—comparable with the extruder screw 22 described above—is also provided with a screw thread and supported rotatably about the axis thereof. Furthermore, the plastic material feeder 3 comprises a drive device 33 driving the shaft of the dosing screw 32. As indicated in FIG. 1 by means of dashed lines, there is preferably situated a reducing device 34 for larger feed material above the feeder 3 in order to guarantee a failure-free operation in the following extrusion device 1 due to the processing of plastic goods reduced by this reducing device 34. The reducing device 34 has at its bottom side an opening 35 for the material feed of the plastic goods into the dosing screw 32. The reduced plastic goods are taken up by the dosing screw 32 and transported through the intake opening 24 in the direction 25 into the extruder 2, where they will be transported further from the extruder screw 22 downstream in the direction of the discharge opening 26. A smaller partial flow of the plastic goods may, for example in the case of a too high feed rate of the dosing screw 32, also reach the section 221 of the extruder screw 22, which is situated upstream of the intake opening 24. In this section 221, wherein, as depicted in FIG. 1, directly at the intake opening 24 the extruder screw 22 is provided with a screw worm with the same incline as in the sections 222, 223 and 224 and wherein, further upstream, the extruder screw 22 comprises a counter-thread 27 with a preferably smaller incline compared with the incline of the screw worm, the plastic goods may be fed from the intake opening 24 away in the opposite direction to the feed direction of the extruder screw 22 only by force, for example if the extruder 2 is obstructed at its free end in the region of the discharge opening 26, in the region of the compression zone 223 or in the discharge zone 224. In normal operation, plastic parts, which by mistake are moved in the counter-flow to the feed direction into the section 221 of the extruder screw 22, will reliably be re-transported in the desired transport direction 25 in the direction towards the discharge opening 26.

The housing 31 of the plastic material feeder 3 is provided with at least one air inlet opening 36, into which compressed air is blown in from the outside in the direction of arrow 37. The compressed air is preferably dry and pre-heated and flows in the dosing screw 32 in the same direction as the plastic goods to be fed in the direction towards the intake opening 24 into the extruder. Residual moisture of the plastic goods in the dosing screw 32 will be absorbed by the compressed air. Due to the configuration according to the invention of the extruder 2 with at least one vapor outlet opening 41 upstream of the intake opening, the air or the vapor, respectively, flow in the opposite direction to the feed direction 25 in the direction of the arrow along the air/vapor path 28 in the section 221 to the vapor outlet opening 41. The plastic material is melted in section 222 of the extruder, afterwards it is compressed in section 223 and closes thereby the preceding sections in the discharge zone 224 in an air-tight way so that the vapor inside the extruder 2 cannot or only as a small partial flow leave through the discharge opening 26.

The device for vapor discharge 4 comprises in FIG. 2 a vapor outlet opening 41, which is provided in the extruder housing 21 upstream of the intake opening 24 and which is connected to a vapor discharge line 42. The air/vapor mixture subsequently enters a water separator 43, it is cooled therein, and the moisture is separated off in the form of a condensate. The exhaust air from the water separator is sucked off by a vapor suction device 44, which is preferably formed as a lateral channel compressor. By means of this vapor suction 44, there is prevailing a slightly negative pressure in the entire device for vapor discharge, guaranteeing that the air/vapor mixture is reliably sucked off from the section 221 of the extruder 2.

FIG. 2 illustrates a detail of the extruder 2 of the extrusion device 1 as well as a sectional view of the bottom of a special configuration of a reducing device 34 for the plastic goods. In the bottom region of the reducing device 34 there are provided several air intake openings 36, into which compressed air for drying the moist plastic goods is injected in the direction of arrow 37. In this configuration the supplied air, together with the reduced plastic goods, is moved, for example guided by means of wedge-like attached sheets or ridges at the bottom of the reducing device, to an opening 35 and further into the dosing screw 32 of the plastic material feeder 3 situated underneath. In addition, there may also be arranged one or several further air inlet openings 36 directly in the housing 31 of the dosing screw 32 of the plastic material feeder 3, through which also air, preferably compressed air, is blown in. Illustration thereof has been omitted in FIG. 2, as this opening or these openings is/are invisibly situated underneath the reducing device 24 shown in a sectional view.

The injected air again flows through the dosing screw 32 to the intake opening 24 and from there on in the direction of the arrow along an air/vapor path 28 in section 221 to the vapor outlet opening 41 in the extruder housing 21. FIG. 2 illustrates a vapor outlet opening 41 in the region of the extruder screw 22 provided with a counter-thread 27 for forming a smaller gap width 29 between the counter-thread 27 and the extruder housing 21. The air/vapor mixture leaves the extrusion device 1 via a vapor discharge line 42. A preferably provided water separator in the vapor discharge line as well as possibly present suction device for the vapor are not displayed in FIG. 2.

The plastic goods to be processed are diverted in the direction of arrow 25, as soon as they are fed from the dosing screw 32 through the intake opening 24 into the inside of the extruder 2, where these are taken up by the extruder screw 22. As is the case in FIG. 1, also in the configuration of FIG. 2 the section 221 is kept clear of plastic material as far as possible. If, nevertheless, any plastic goods are moved upstream of the intake opening 24 into the section 221, the section with the counter-thread 27 and a small free gap width 29, which is adjoining the drive device 23, will reliably prevent an obstruction of the air/vapor path 28. In this way, vapor may be reliably discharged through the outlet opening 41 from the inside of the extruder 2.

The invention claimed is:

1. An extrusion device for extruding thermoplastic material, the extrusion device comprising:
   a drive device;
   an extruder screw that is driven by the drive device;
   an extruder housing in which the extruder screw driven by the drive device is supported rotatably about the axis thereof, the extruder housing including an intake opening to which a plastic material feeder is connected, the plastic material feeder including at least one air inlet opening,
   wherein the extruder housing includes at least one vapor outlet opening upstream of the intake opening, wherein an air/vapor path is defined within a section from the intake opening to the vapor outlet opening and there is arranged at the extruder screw in the region of the air/vapor path a counter-thread, the counter-thread has the same path direction as a screw worm of the extruder screw,
   characterized in that the counter-thread is provided at the extruder screw in the region of the air/vapor path with a smaller incline and smaller flight depth compared with the incline of the screw worm of the extruder screw, wherein the air/vapor path is situated within the section alongside a segment of the extruder screw and then subsequently alongside at least a segment of the counter-thread.

2. The extrusion device according to claim 1, characterized in that the counter-thread is arranged at the extruder screw in a longitudinal distance in an upstream direction of the intake opening of at least one screw flight of the screw worm of the extruder screw.

3. The extrusion device according to claim 1, characterized in that the air/vapor path extends in a gap between an internal surface of the extruder housing and the extruder screw.

4. The extrusion device according to claim 2, characterized in that the gap width between the counter-thread and the extruder housing is less than 1 mm, or less than 0.5 mm.

5. The extrusion device according to claim 1, characterized in that a vapor suction device is connected to the at least one vapor outlet opening.

6. The extrusion device according to claim 5, characterized in that the vapor suction device is formed as a lateral channel compressor.

7. The extrusion device according to claim 5, characterized in that a water separator is connected between the vapor outlet opening and the vapor suction device.

* * * * *